(No Model.)
T. F. WOODSIDE.
FOLDING CRATE FOR FOWLS.
No. 275,968. Patented Apr. 17, 1883.
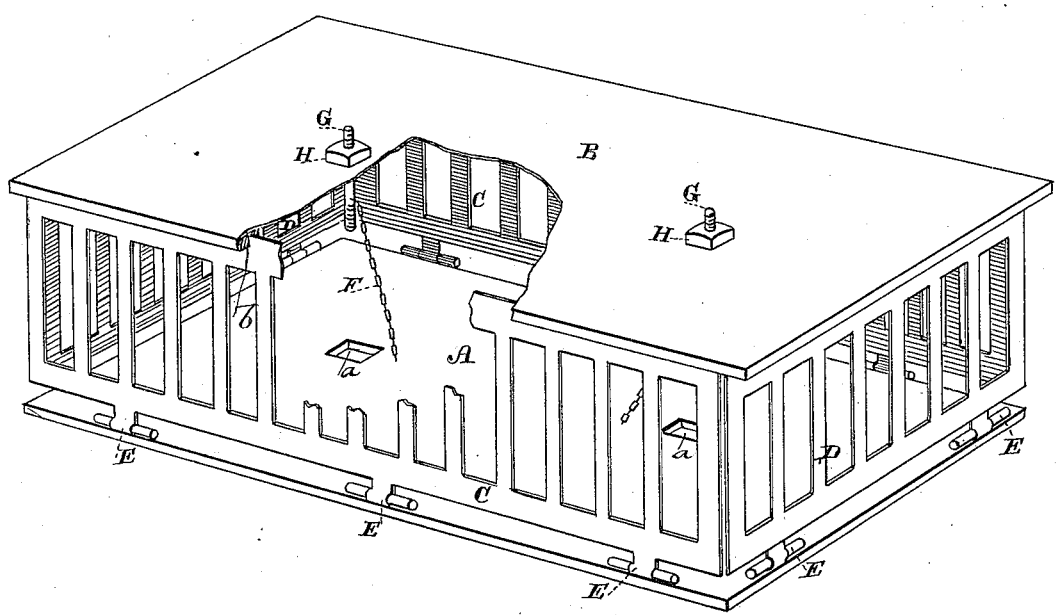
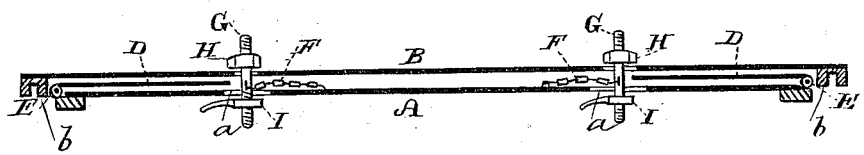
Witnesses,
Geo. H. Strong
Inventor
Thos. F. Woodside
By Dewey & Co.
Attorneys

UNITED STATES PATENT OFFICE.

THOMAS F. WOODSIDE, OF MODESTO, CALIFORNIA.

FOLDING CRATE FOR FOWLS.

SPECIFICATION forming part of Letters Patent No. 275,968, dated April 17, 1883.

Application filed January 6, 1883. (No model.)

*To all whom it may concern:*

Be it known that I, THOMAS F. WOODSIDE, of Modesto, county of Stanislaus, State of California, have invented an Improved Folding Crate for Fowls; and I hereby declare the following to be a full, clear, and exact description thereof.

My invention relates to an improved crate for the transportation of fowls and other articles; and it consists in certain details of construction, as hereinafter fully described, and specifically pointed out in the claim.

Referring to the accompanying drawings for a more complete explanation of my invention, Figure 1 is a view of my crate set up, with part of one edge broken away. Fig. 2 is a view showing it collapsed or closed up.

The employment of crates for the transportation of fowls and other articles entails a considerable expense for returning the empty crates, and this I desire to avoid by collapsing or folding the crates after they are empty.

A is the bottom, B the top, C C the sides, and D D the ends, of my crate.

The top and bottom may be made tight, as shown, or open, if desired, and the sides and ends are preferably made of wood or stiff sheet metal. The ends and sides have hinges E, by which they are attached to the edges of the bottom, so that they may be folded inward and lie flat upon the bottom. The top will then lie upon them, and the whole may be secured together by a button, screw, or clamp, so that the crate will occupy but little more than the thickness of the top, bottom, and the side or end pieces.

When the crate is to be set up the top is released from its clamps and lifted, so that the sides and ends may be successively turned up, so as to stand vertically between the bottom and top.

Grooves or channels $h$ may be formed along the edges beneath the top to receive the edges of the sides and ends and keep them in place.

In order to hold the whole firmly in place and brace the parts against side movement, chains or rods F are fixed to the bottom, and extend upward to the top, inclining either to or from each other, so that when drawn tight they act as braces, as well as to draw the parts together. If rigid rods are used, they must be arranged to fold upon the bottom when the crate is collapsed. In the present case I have shown the braces F made of chains, the lower ends of which are secured to the bottom, and the upper ends to screw-bolts G, which pass through the top of the crate and have nuts H above. When the parts of the crate are set up in place these nuts are turned down tight upon the top, thus straining the chains or rods and making tension-braces, which will hold them firmly in place.

The bolts G may be extended below the point at which the chains are attached to them, and holes $a\ a$ made in the bottom of the crate, which will allow these ends to pass through when the crate is collapsed, and nuts I are fitted to these ends, which may be screwed up against the bottom when the crate is folded, thus holding the whole firmly together.

Having thus described my invention, what I claim as new, and desire to secure by Letters Patent, is—

A knockdown crate consisting of the bottom A, provided with openings $a$, hinged sides and ends C D, and top B, channeled at $b$, near its edge, in combination with short screw-rods G, threaded at both ends, chains F, and nuts H, all constructed and arranged as set forth.

In witness whereof I hereunto set my hand.

THOMAS F. WOODSIDE.

Witnesses:
 GEO. H. STRONG,
 G. W. EMERSON.